United States Patent [19]

Tojo et al.

[11] Patent Number: 5,041,329

[45] Date of Patent: Aug. 20, 1991

[54] VULCANIZED RUBBER ARTICLE AND PROCESS FOR THE PREPARATION OF THE SAME

[75] Inventors: Tetsuo Tojo; Yoshiharu Kikuchi; Keiji Okada, all of Ichihara, Japan

[73] Assignee: Mitsui Petrochemical Industries, Ltd., Tokyo, Japan

[21] Appl. No.: 621,970

[22] Filed: Dec. 4, 1990

[51] Int. Cl.$^5$ .................................................. B32B 9/00
[52] U.S. Cl. ..................................... 428/213; 428/409; 428/522; 427/144; 427/373
[58] Field of Search ................ 427/244, 373; 428/213, 428/409, 522

[56] References Cited

U.S. PATENT DOCUMENTS 4,460,652  7/1984  Francis ................................. 428/409

Primary Examiner—William J. Van Balen
Attorney, Agent, or Firm—Sherman and Shalloway

[57] ABSTRACT

Disclosed are vulcanized rubber articles of foamed type and non-foamed type which are prepared by vulcanizing a vulcanizable and foamable (or a vulcanizable) molded product made of a chlorinated ethylene/α-olefin copolymer rubber, chlorinated polyethylene or chlorosulfonated polyethylene, said vulcanizable and foamable (or vulcanizable) molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10. Also disclosed are processes for the preparation of the vulcanized rubber articles of foamed type and non-foamed type.

12 Claims, 1 Drawing Sheet

F I G. 1 (a)   F I G. 1 (b)
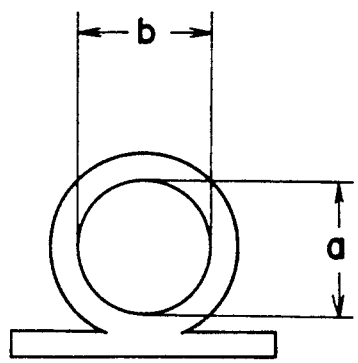 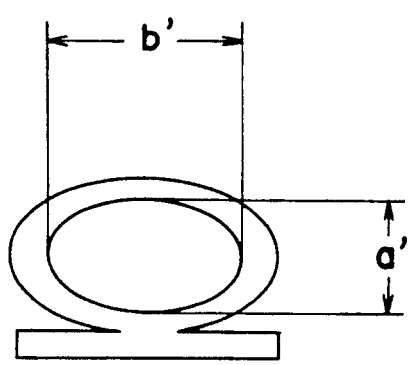

VULCANIZED RUBBER ARTICLE AND PROCESS FOR THE PREPARATION OF THE SAME

FIELD OF THE INVENTION

The present invention relates to a vulcanized rubber article (including both a vulcanized rubber foamed article and a vulcanized rubber non-foamed article) and a process for the preparation of the same. More particularly, the invention relates to a vulcanized rubber article having high surface smoothness which is made of a chlorinated ethylene/α-olefin copolymer rubber, chlorinated polyethylene or chlorosulfonated polyethylene and a process for the preparation of the same, and more specifically the invention relates to a vulcanized rubber foamed article and a process for the preparation of the same.

BACKGROUND OF THE INVENTION

Vulcanized rubber foamed articles have been widely used for cushioning materials, sealing materials, sound-insulating materials, electrical insulating materials and the like. Recently, vulcanized rubber foamed articles which are more excellent in surface smoothness than the conventional ones have been eagerly desired from the viewpoints of sealing properties and fashionability.

For obtaining vulcanized rubber foamed articles of high surface smoothness, there have been studied various methods such as a method of adjusting a vulcanization speed or a foaming speed and a method of varying a heating means to adjust a heat transfer speed.

Even by utilizing the above methods, however, the obtained vulcanized rubber foamed articles show insufficient surface smoothness, for example, the threshold limit value of the surface roughness thereof is 10 μm when measured using Surfcom 200B (produced by Tokyo Seimitsu Co., Ltd.) according to JIS B-0601.

The present inventors have earnestly studied pursuing vulcanized rubber foamed articles having high surface smoothness, and they have found that the vulcanized rubber foamed articles having high surface smoothness (e.g., those having a surface roughness of less than 10 μm) and having a prominently high shape-retention ratio can be obtained by a process of continuously dipping a vulcanizable and foamable tubular molded product made of a chlorinated ethylene/α-olefin copolymer rubber, chlorinated polyethylene (CPE) or chlorosulfonated polyethylene which has been extruded from an extruder, in an isopropyl alcohol solution such as an alkylammonium halide solution, and introducing the molded product into a hot air-vulcanizing bath to conduct vulcanization and foaming operation. Thus, the present invention has been accomplished. In recent years, the size of a foamed article used for sealing tends to be made larger and the shape thereof tends to be more complicated. In addition, the foamed article is desired to have a high shape-retention ratio, so that the above-described process for preparing vulcanized rubber foamed articles is very advantageous in industrial use.

The above-described process is also advantageous for preparing vulcanized rubber non-foamed articles having high surface smoothness and high shape-retention ratio.

SUMMARY OF THE INVENTION

The present invention is intended to solve the above-mentioned problems associated with the prior art, and the object of the invention is to provide vulcanized rubber articles improved in surface smoothness and shape-retention stability and processes for the preparation of the same. Particularly, the object of the invention is to provide vulcanized rubber foamed articles and processes for the preparation of the same.

A first vulcanized rubber article of the invention is a vulcanized rubber article prepared by vulcanizing a vulcanizable molded product made of a chlorinated ethylene/α-olefin copolymer rubber, said vulcanizable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

A process for the preparation of the first vulcanized rubber article according to the invention comprises the steps of coating a surface of a vulcanizable molded product made of a chlorinated ethylene/α-olefin copolymer rubber with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing the vulcanizable molded product.

A second vulcanized rubber article of the invention is a vulcanized rubber article which has a surface roughness of less than 10 μm and is prepared by vulcanizing and foaming a vulcanizable and formable molded product made of a chlorinated ethylene/α-olefin copolymer rubber, said vulcanizable and foamable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

A process for the preparation of the second vulcanized rubber article according to the invention comprises the steps of coating a surface of a vulcanizable and foamable molded product made of a chlorinated ethylene/α-olefin copolymer rubber with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing and foaming the vulcanizable and foamable molded product.

A third vulcanized rubber article of the invention is a vulcanized rubber article prepared by vulcanizing a vulcanizable molded product made of chlorinated polyethylene, said vulcanizable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

A process for the preparation of the third vulcanized rubber article according to the invention comprises the steps of coating a surface of a vulcanizable molded product made of chlorinated polyethylene with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing the vulcanizable molded product.

A fourth vulcanized rubber article of the invention is a vulcanized rubber article which has a surface roughness of less than 10 μm and is prepared by vulcanizing and foaming a vulcanizable and formable molded product made of chlorinated polyethylene, said vulcanizable and foamable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

A process for the preparation of the fourth vulcanized rubber article comprises the steps of coating a surface of a vulcanizable and foamable molded product made of chlorinated polyethylene with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing and foaming the vulcanizable and foamable molded product.

A fifth vulcanized rubber article of the invention is a vulcanized rubber article prepared by vulcanizing a vulcanizable molded product made of chlorosulfonated polyethylene, said vulcanizable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

A process for the preparation of the fifth vulcanized rubber article according to the invention comprises the steps of coating a surface of a vulcanizable molded product made of chlorosulfonated polyethylene with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing the vulcanizable molded product.

A sixth vulcanized rubber article of the invention is a vulcanized rubber article which has a surface roughness of less than 10 μm and is prepared by vulcanizing and foaming a vulcanizable and formable molded product made of chlorosulfonated polyethylene, said vulcanizable and foamable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

A process for the preparation of the sixth vulcanized rubber article according to the invention comprises the steps of coating a surface of a vulcanizable and foamable molded product made of chlorosulfonated polyethylene with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing and foaming the vulcanizable and foamable molded product.

BRIEF DESCRIPTION OF THE DRAWING

FIG. 1 illustrates a method of measuring a shape-retention ratio of an article. FIG. 1-(a) is a view showing a sectional shape of an extruder head. FIG. 1-(b) is a view showing a sectional shape of a sample obtained after vulcanization.

DETAILED DESCRIPTION OF THE INVENTION

The vulcanized rubber articles and the processes for the preparation of the same according to the present invention are described in detail hereinafter.

The first, the third and the fifth vulcanized rubber articles of the invention are non-foamed articles prepared by vulcanizing vulcanizable molded products made of a chlorinated ethylene/α-olefin copolymer rubber, chlorinated polyethylene and chlorosulfonated polyethylene, respectively, each vulcanizable molded product having been surface-treated with a specific coating solution.

The second, the fourth and the sixth vulcanized rubber articles of the invention are foamed articles prepared by vulcanizing vulcanizable and foamable molded products made of a chlorinated ethylene/α-olefin copolymer rubber, chlorinated polyethylene and chlorosulfonated polyethylene, respectively, each vulcanizable and foamable molded product having been surface-treated with a specific coating solution.

Chlorinated ethylene/α-olefin copolymer rubber

The chlorinated ethylene/α-olefin copolymer rubber employable in the invention is a synthetic rubber obtained by chlorinating a random copolymer rubber basically derived from ethylene and α-olefin, and the chlorinated ethylene/α-olefin copolymer rubber may or may not contain a polyene component.

The α-olefin constituting the ethylene/α-olefin copolymer rubber employed prior to the chlorination generally has 3 - 10 carbon atoms. Concrete examples of the α-olefins include propylene, butene-1, pentene-1, 4-methylpentene-1, hexene-1, heptene-1, octene-1, nonene-1 and decene-1. Of these, propylene and butene-1 are preferably employed in the invention.

The molar ratio of ethylene to α-olefin (ethylene/α-olefin), both constituting the ethylene/α-olefin copolymer rubber, is generally in the range of 50/50 to 95/5, preferably 60/40 to 93/7, more preferably 70/30 to 91/9.

As the polyene component, non-conjugated polyene is employed. Concrete examples of the non-conjugated polyenes include 1,4-hexadiene, 5-ethylidene-2-norbornene, 5-vinyl-2-norbornene, 5-isopropenyl-2-norbornene and dicyclopentadiene. Of these, 5-ethylidene-2-norbornene and dicyclopentadiene are preferably employed.

The content of the non-conjugated polyene component generally is at most 50, preferably at most 40, more preferably at most 30, in terms of iodine value. In terms of % by mole, the content thereof generally is at most 10% by mole, preferably at most 7% by mole, more preferably at most 5% by mole.

The content of chlorine (chlorine content) in the chlorinated ethylene/α-olefin copolymer rubber used in the invention is generally in the range of 20 to 40% by weight, preferably 25 to 35% by weight. The Mooney viscosity [$ML_{1+4}(121°\ C.)$] (ASTM D 927-57T) of the chlorinated ethylene/α-olefin copolymer rubber is generally in the range of 10 to 190, preferably 20 to 150, more preferably 30 to 120, from the viewpoints of moldability and workability.

The chlorinated ethylene/α-olefin copolymer rubber employable in the invention can be prepared by various processes. For example, the ethylene/α-olefin copolymer rubber is pulverized into fine particles, and the fine particles of the copolymer rubber in the form of an aqueous suspension is brought into contact with molecular chlorine at a temperature of approx. 70° to 90° C., to chlorinate the ethylene/α-olefin copolymer rubber. Otherwise, the ethylene/α-olefin copolymer rubber is dissolved in a solvent which is stable against chlorine compounds such as carbon tetrachloride and tetrachloroethylene, and the resulting homogeneous solution of the copolymer rubber is brought into contact with molecular chlorine, to chlorinate the ethylene/α-olefin copolymer rubber. Alternatively, a chlorine compound such as N-chloroacetamide, N-chlorosuccimide or 1,3-dichloro-5,5-dimethylhydantoin is uniformly mixed with the ethylene/α-olefin copolymer rubber using a roll, Banbury mixer or the like, and the copolymer rubber containing the chlorine compound is heated to a temperature at which chlorine is liberated, to chlorinate the ethylene/α-olefin copolymer rubber. The ethylene/α-olefin copolymer rubber having been chlorinated as above is then subjected to the following treatments to obtain a chlorinated ethylene/α-olefin copolymer rubber.

That is, in the case of chlorinating the ethylene/α-olefin copolymer rubber in the form of an aqueous suspension, the chlorinated rubber is washed with water to remove the unreacted molecular chlorine from the chlorinated rubber, and the chlorinated rubber is dried.

In the case of chlorinating the ethylene/α-olefin copolymer rubber in the form of a homogeneous solution, the reaction liquid is introduced into a poor solvent for the chlorinated rubber, such as excessive methanol, then the obtained precipitate is filtered, and the filtered precipitate is washed with the above-mentioned solvent and dried.

Among the above-described methods for chlorinating the ethylene/α-olefin copolymer rubber, preferred is a method of blowing molecular chlorine into a halide solvent such as carbon tetrachloride in the presence of a radical initiator.

Chlorinated polyethylene (CPE)

The chlorinated polyethylene (CPE) employable in the invention is a kind of thermoplastic elastomers. Generally employed is an elastomer obtained by chlorinating polyethylene having a density of 0.93 to 0.96 g/cm$^3$. The content of chlorine in the chlorinated polyethylene is generally in the range of 25 to 45% by weight, preferably 30 to 40% by weight. The Mooney viscosity [ML$_{1+4}$(121° C.)] (ASTM D 927-57T) of the chlorinated polyethylene is generally in the range of 10 to 190, preferably 20 to 150, more preferably 30 to 120, from the viewpoints of moldability and workability.

The chlorinated polyethylene can be prepared, for example, by chlorinating a high-density polyethylene powder in an aqueous suspension.

Chlorosulfonated polyethylene (CSM)

The chlorosulfonated polyethylene (CSM) employable in the invention is a synthetic rubber obtained by chlorosulfonating high-molecular weight polyethylene having a chain structure.

The content of chlorine in the chlorosulfonated polyethylene is generally in the range of 25 to 43% by weight, preferably 30 to 40% by weight. The content of sulfur in the chlorosulfonated polyethylene is generally in the range of 0.9 to 1.4% by weight. The Mooney viscosity [ML$_{1+4}$(121° C.)] (ASTM D 927-57%) of the chlorosulfonated polyethylene is generally in the range of 10 to 190, preferably 20 to 150, more preferably 30 to 120, from the viewpoints of moldability and workability.

The chlorosulfonated polyethylene can be prepared, for example, by chlorosulfonating high-molecular weight polyethylene with molecular chlorine and sulfur dioxide.

Coating solution

The coating solution employable in the invention is a solution containing at least one compound selected from alkylammonium halide, alkylphosphonium halide, amine having an acid dissociation constant (pKa) of not less than 10 and amine salt having an acid dissociation constant (pKa) of not less than 10.

Examples of the alkylammonium halides include, for example, tetramethylammonium chloride, stearyltrimethylammonium chloride, distearyldimethylammonium chloride and tetrabutylammonium bromide.

Examples of the alkylphosphonium halides include, for example, tetramethylphosphonium iodide and tetrabutylphosphonium bromide.

Examples of the amines having an acid dissociation constant (pKa) of not less than 10 include, for example, dicyclohexylamine and 1,8-diaza-bicyclo(5,4,0)-undecene-7.

Examples of the amine salts having an acid dissociation constant (pKa) of not less than 10 include, for example, organic carboxylic acid salts such as dicyclohexylamine benzoate, and phenol salts such as a phenol salt of 1,8-diaza-bicyclo(5,4,0)-undecene-7.

Among the above-exemplified compounds, distearyldimethylammonium chloride and dicyclohexylamine are preferably employed in the invention.

As the solvent for the above-mentioned compounds, there can be employed any of water, alcohols, ketones, chlorine solvents, aromatic solvents and hydrocarbon solvents. In the case of using a chlorinated ethylene/α-olefin copolymer rubber as a raw material of the molded product, preferably employed are alcohols such as isopropyl alcohol, butyl alcohol and octyl alcohol, (particularly isopropyl alcohol), from the viewpoint of affinity for the copolymer rubber. Also in the case of using chlorinated polyethylene as a raw material of the molded product, preferably employed are alcohols such as isopropyl alcohol, butyl alcohol and octyl alcohol, (particularly isopropyl alcohol), from the viewpoint of affinity for the chlorinated polyethylene. Further, also in the case of using chlorosulfonated polyethylene as a raw material of the molded product, preferably employed are alcohols such as isopropyl alcohol, butyl alcohol and octyl alcohol, (particularly isopropyl alcohol), from the viewpoint of affinity for the chlorosulfonated polyethylene.

The surface treatment of the molded product with the above-mentioned coating solution is carried out, for example, by coating the solution over the molded product by the use of a brush or dipping the molded product in the solution. In the case of continuously coating the molded product, a dipping method is preferably employed.

The amount of the coating solution is generally in the range of 0.001 to 10 g/m², preferably 0.01 to 5 g/m², in terms of solid content.

It is preferred that the concentration of the coating solution is appropriately determined depending on the viscosity of the chlorinated ethylene/α-olefin copolymer rubber, the chlorinated polyethylene or the chlorosulfonated polyethylene, that is, a raw material of the molded product.

The vulcanizable molded product or the vulcanizable and foamable molded product made of the chlorinated ethylene/α-olefin copolymer rubber, the chlorinated polyethylene or the chlorosulfonated polyethylene is surface-treated with the above-mentioned coating solution, followed by a vulcanization procedure or a vulcanization-foaming procedure, to prepare articles of high surface smoothness. In the invention, there can be obtained a foamed article having a surface roughness of less than 10 u μm, such article being unobtainable in the prior art.

The vulcanized rubber article of the present invention can be obtained by surface-treating the vulcanizable molded product or the vulcanizable and foamable molded product made of a chlorinated ethylene/α-olefin copolymer rubber, chlorinated polyethylene or chlorosulfonated polyethylene with the above-mentioned coating solution and then subjecting thus treated molded product to a vulcanization procedure or a vulcanization-foaming procedure.

For forming the vulcanizable molded product, there can be used a variety of known additives according to the processing characteristics in the preparation of the article and the properties required for the article, in addition to the above-described essential component, that is, the chlorinated ethylene/α-olefin copolymer rubber, chlorinated polyethylene or the chlorosulfonated polyethylene. Examples of such additives include a vulcanizing agent, a vulcanizing assistant, a reinforcing agent for rubbers, a filler, a softening agent, a metal activator, a compound having oxymethylene structure, a scorch retarder, an anti-aging agent and a processing aid.

For forming the vulcanizable and foamable molded product, there can be used a foaming agent, a foaming assistant and the above-mentioned known additives according to the processing characteristics in the preparation of the foamed article and the properties required for the foamed article, in addition to the above-described essential component.

In the invention, the vulcanization of the molded product is particularly effected by triazine vulcanization.

In the triazine vulcanization, preferably employable as a vulcanizing agent is a triazine thiol compound having the following formula (I):

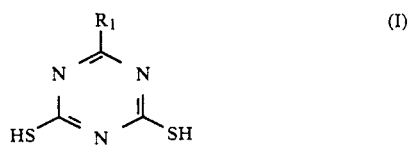

in which $R_1$ represents $-NR_2R_3$, $-OR_2$ or $-SR_2$, wherein $R_2$ and $R_3$ each represent a hydrogen atom, a substituted or unsubstituted alkyl group, or a substituted or unsubstituted aryl group.

Examples of the triazine thiol compounds include triazine-2,4,6-trithiol, 2-dibutylaminotriazine-4,6-dithiol, 2-phenylaminotriazine-4,6-dithiol, 2-hexylaminotriazine-4,6-dithiol, 2-diethylaminotriazine-4,6dithiol and 2-butoxytriazine-4,6-diol.

The vulcanizing agent is used in an amount of $1 \times 10^{-3}$ to $2.5 \times 10^{31\,2}$ mole, preferably $1.5 \times 10^{-3}$ to $2 - 10^{-2}$ mole, more preferably $3 \times 10^{-2}$ to $1.3 \times 10^{-2}$ mole, based on 100 g of the chlorinated ethylene/α-olefin copolymer rubber, the chlorinated polyethylene or the chlorosulfonated polyethylene. If the amount of the vulcanizing agent is less than the lower limit of the above range, a vulcanized article having favorable rubber elasticity cannot be obtained. If the amount of the vulcanizing agent is more than the upper limit of the above range, the obtained article is reduced in the elongation, and thereby it can be hardly used in practice.

When a triazine compound is used as the vulcanizing agent, a vulcanizing assistant is added.

As the vulcanizing assistant, an organic base having an acid dissociation constant (pKa) of not less than 7 or a compound capable of producing said organic base is employed. Concrete examples of such vulcanizing assistants include 1,8-diaza-bicyclo(5,4,0)-undecene-7, laurylamine, benzylamine, dibenzylamine, N-methylmorpholine, dicyclohexylamine, zinc dibutyldithiocarbamate, piperidine pentamethylenedithiocarbamate, N-cyclohexyl-2-benzothiazolylsulfenamide, dicyclohexylamine benzoate, piperidine benzoate, dipentamethylenethiuram tetrasulfide, tetramethylthiuram disulfide, and onium salts such as tetramethylphosphonium iodide, tetramethylammonium chloride, tetrabutylphosphonium bromide, tetrabutylammonium bromide and distearyldimethylammonium chloride. The vulcanizing assistant mentioned as above is used in an amount of $5 \times 10^{-4}$ to $2 \times 10^{-2}$ mole, preferably $1 \times 10^{-3}$ to $1 \times 10^{-2}$ mole, based on 100 g of the chlorinated ethylene/α-olefin copolymer rubber, the chlorinated polyethylene or the chlorosulfonated polyethylene. The above-mentioned compounds can be employed singly or in combination of two or more compounds as the vulcanizing agent.

Concrete examples of the foaming agents include inorganic foaming agents such as sodium hydrocarbonate, sodium carbonate, ammonium hydrocarbonate, ammonium carbonate and ammonium nitrite; nitroso compounds such as N,N'-dimethyl-N,N'-dinitrosoterephthalamide and N,N'-dinitrosopentamethylenetetramine; azo compounds such as azodicarbonamide, azobisisobutyronitrile, azocyclohexylnitrile, azodiaminobenzene and barium azodicarboxylate; sulfonyl hydrazide such as benzenesulfonyl hydrazide, toluenesulfonyl hydrazide, p,p'-oxybis(benzenesulfonyl hydrazide) and diphenylsulfone-3,3'-disulfonyl hydrazide; and azido compounds such as calcium azide, 4,4'-diphenyldisulfonylazide and p-toluenesulfonylazide. Particularly preferred are nitroso compounds, azo compounds and azide compounds.

The foaming agent mentioned as above is used in an amount of $1.0 \times 10^{-3}$ to $3.0 \times 10^{-1}$ mole, preferably $2.0 \times 10^{-3}$ to $2.0 \times 10^{-1}$ mole, based on 100 g of the chlorinated ethylene/α-olefin copolymer rubber, the chlorinated polyethylene or the chlorosulfonated polyethylene. By using the foaming agent in such amount, a foamed article having an apparent specific gravity of approx. 0.03 to 0.7 can be obtained.

Examples of the foaming assistants employable with the foaming agent include organic acids such as salicylic acid, phthalic acid and stearic acid, ureas and their derivatives. The foaming assistant serves to decrease a decomposition temperature of the foaming agent, to accelerate decomposition of the foaming agent, and to uniformize foams.

Examples of the reinforcing agents for rubbers include various carbon black such as SRF, GPE, FEF, MAF, HAF, ISAF, SAF, FT and MT, and silicic acid powder. They can be employed appropriately.

Examples of the fillers employable in the invention include light-duty calcium carbonate, heavy-duty calcium carbonate, talc and clay.

The reinforcing agent or the filler is generally used in an amount of not more than 200 parts by weight, preferably not more than 150 parts by weight, per 100 parts by weight of the chlorinated ethylene/$\alpha$-olefin copolymer rubber, the chlorinated polyethylene or the chlorosulfonated polyethylene.

Examples of the softening agents employable in the invention include petroleum type softeners such as process oil, lubricating oil, paraffin, liquid paraffin, petroleum asphalt and vaseline; coal tar type softeners such as coal tar and coal tar pitch; aliphatic oil type softeners such as castor oil, linseed oil, rapeseed oil and coconut oil; tall oil; factice; waxes such as beeswax, carnauba wax and lanolin; aliphatic acids and metallic salts thereof such as ricinolic acid, palmitic acid, barium stearate and calcium stearate; synthetic high molecular substances such as petroleum resins, atactic polypropylene and coumaroneindene resins; ester type plasticizers such as dioctyl phthalate, dioctyl adipate and dioctyl sebacate; microcrystalline wax; liquid polybutadiene; modified liquid polybutadiene; and liquid thiokol.

The softening agent is generally used in an amount of not more than 100 parts by weight, preferably not more than 70 parts by weight, per 100 parts by weight of the chlorinated ethylene/$\alpha$-olefin copolymer rubber, the chlorinated polyethylene or the chlorosulfonated polyethylene.

Examples of the metal activators include magnesium oxide, zinc salt of higher fatty acid, red lead oxide, litharge and calcium oxide. The metal activator is generally used in an amount of 3 to 15 parts by weight, preferably 5 to 10 parts by weight, per 100 parts by weight of the chlorinated ethylene/$\alpha$-olefin copolymer rubber, the chlorinated polyethylene or the chlorosulfonated polyethylene.

For smoothly conducting various rubber-processing procedures, it is desired to sue compounds having oxyethylene structure and starch retarders.

Concrete examples of the compounds having oxyethylene structure include ethylene glycol, diethylene glycol, polyethylene glycol, propylene glycol and polypropylene glycol.

The compound having oxyethylene structure is generally used in an amount of 0.1 to 10 parts by weight, preferably 1 to 5 parts by weight, per 100 parts by weight of the chlorinated ethylene/$\alpha$-olefin copolymer rubber, the chlorinated polyethylene or the chlorosulfonated polyethylene.

As the scorch retarder, a variety of known scorch retarders can be employed. Concrete examples of the scorch retarders include maleic anhydride, thioimide compounds, sulfenamide compounds and sulfonamide compounds.

The scorch retarder is generally used in an amount of 0.2 to 5 parts by weight, preferably 0.3 to 3 parts by weight, per 100 parts by weight of the chlorinated ethylene/$\alpha$-olefin copolymer rubber, the chlorinated polyethylene or the chlorosulfonated polyethylene.

If the anti-aging agent is used in the invention, a life of a material for the article of the invention can be prolonged. Concrete examples of the anti-aging agents include aromatic secondary amine type stabilizers such as phenylnaphthylamine and N,N'-di-2-naphthyl-p-phenylenediamine; phenol type stabilizers such as dibutylhydroxytoluene and tetraquis[methylene(3,5-di-t-butyl-4-hydroxy)hydrocinnamate]methane; thioether type stabilizers such as bis[2-methyl-4-(3-n-alkylthiopropionyloxy)-5-t-butylphenyl]sulfide; and dithiocarbamate type stabilizers such as nickel dibutyldithiocarbamate. Those anti-aging agents can be employed singly or in combination of two or more compounds.

The anti-aging agent is generally used in an amount of 0.1 to 5 parts by weight, preferably 0.5 to 3 parts by weight, per 100 parts by weight of the chlorinated ethylene/$\alpha$-olefin copolymer rubber, the chlorinated polyethylene or the chlorosulfonated polyethylene.

As the processing aid, there can be employed various compounds which are generally used for rubber processing. Concrete examples of the processing aids include ricinoleic acid, stearic acid, palmitic acid, lauric acid, barium stearate, calcium stearate, zinc stearate, esters of said acids, higher fatty acids, and salts and esters of the higher fatty acids.

The processing aid is generally used in an amount of not more than 10 parts by weight, preferably approx. 1 to 5 parts by weight, per 100 parts by weight of the chlorinated ethylene/$\alpha$-olefin copolymer rubber, the chlorinated polyethylene or the chlorosulfonated polyethylene.

Besides the above-mentioned additives, there can be used other rubbers, for example, ethylene propylene rubber, butyl rubber and SBR, provided that the addition of those rubbers do not spoil the characteristics of the rubber composition.

The rubber composition can be prepared, for example, by the following process.

Either the chlorinated ethylene/$\alpha$-olefin copolymer rubber, the chlorinated polyethylene or the chlorosulfonated polyethylene and the above-mentioned additives such as reinforcing agent, filler and softening agent are kneaded at a temperature of approx. 80° to 170° C. for approx. 3 to 10 minutes using an appropriate mixer such as a Banbury mixer; then to the resulting mixture is added a combination of the vulcanizing agent and the vulcanizing assistant or a combination of the vulcanizing agent, the vulcanizing assistant, the foaming agent and the foaming assistant using an appropriate roll such as an open roll; and the obtained mixture is kneaded at a roll temperature of approx. 40° to 80° C. for approx. 5 to 30 minutes, to prepare a rubber composition in the form of ribbon or sheet.

Otherwise, either the chlorinated ethylene/$\alpha$-olefin copolymer rubber, the chlorinated polyethylene or the chlorosulfonated polyethylene and the additives are directly supplied to an extruder heated to approx. 80° to 100° C., and the residence time thereof in the extruder of approx. 0.5 to 5 minutes is taken, to prepare a rubber composition in the form of pellet.

The rubber composition prepared as above is generally molded using an extruder, then the molded product of the composition is surface-treated with the aforementioned coating solution by means of dipping or the like, and thus treated product is heated in a hot-air heating bath, a glass bead-fluidized bed, a microwave heating apparatus, etc. without application of pressure, to vulcanize or vulcanize and foam the molded product. The temperature for the heating is generally in the range of 150° to 270° C., and the time required for the heating is generally in the range of 1 to 30 minutes.

The vulcanized rubber non-foamed article obtained as above is more excellent in the surface smoothness as compared with the conventional vulcanized rubber non-foamed articles.

The vulcanized rubber foamed article obtained as above is also more excellent in the surface smoothness as compared with the conventional vulcanized rubber foamed articles, and the surface roughness (JIS B-0601) of the foamed article is less than 10 μm. The reason why the vulcanized rubber article having high surface smoothness can be obtained is presumed as follows. That is, the coating solution for the surface treatment permeates the surface of the vulcanizable and foamable molded product made of the chlorinated ethylene/α-olefin copolymer rubber, chlorinated polyethylene or the chlorosulfonated polyethylene, and the aforementioned alkylammonium halide, alkylphosphonium halide, amine having an dissociation constant (pKa) of not less than 10 or amine salt having an dissociation constant (pKa) of not less than 10 contained in the coating solution serves as an effective vulcanization accelerator, whereby the whole of the above-mentioned vulcanizable and foamable molded product is vulcanized and foamed after the formation of so-called "skin layer".

In the present invention, the skin layer is formed on the surface of the vulcanizable and foamable molded product through the crosslinking reaction prior to the vulcanization-foaming procedure of the molded product, so that the resulting article is excellent in the shape-retention properties. This fact is also applied to the vulcanized rubber non-foamed article prepared as above.

EFFECT OF THE INVENTION

The first, the third and the fifth vulcanized rubber articles (i.e., vulcanized rubber non-foamed articles) of the present invention are articles prepared by vulcanizing a vulcanizable molded product made of a specific synthetic rubber or a specific elastomer having been surface-treated with a specific coating solution, so that they are excellent in surface smoothness, shape-retention properties and sealing properties.

The second, the fourth and the sixth vulcanized rubber articles (i.e., vulcanized rubber foamed articles) of the present invention are articles prepared by vulcanizing and foaming a vulcanizable and foamable molded product made of a specific synthetic rubber or a specific elastomer having been surface-treated with a specific coating solution, so that they are excellent in surface smoothness, shape-retention properties and sealing properties. The vulcanized rubber foamed articles of the invention have a surface roughness (i.e., indication of surface smoothness, based on JIS B-0601) of less than 10 μm.

The processes for the preparation of the first, the third and the fifth vulcanized rubber articles according to the invention can provide the first, the third and the fifth vulcanized rubber articles of the invention having the above-mentioned effects.

The processes for the preparation of the second, the fourth and the sixth vulcanized rubber articles according to the invention can provide the second, the fourth and the sixth vulcanized rubber foamed articles of the invention having the above-mentioned effects.

The present invention is further described by the following examples, but the examples are given by no means to restrict the invention.

The methods for testing physical properties of the articles (samples) obtained in the examples and the comparison examples are as follows.

Test method (1) Apparent specific gravity

The apparent specific gravity of the sample was measured according to a displacement method using an automatic gravimeter (produced by Toyo Seiki Seisakusho Co., Ltd.).

(2) Tensile strength

The tensile strength of the sample was measured at a tensile speed of 500 mm/min. according to JIS K-6301.

(3) Surface

The surface roughness of the sample was measured according to JIS B-0601 using Surfcom 200B (produced by Tokyo Seimitsu Co., Ltd.).

(4) Shape-retention stability

As shown in FIG. 1-(a), the size of the extruder head, a and b, were precisely measured using a magnifying glass of 10 magnifications, and a ratio of a/b (reference value) was determined. Then, as shown in FIG. 1-(b), the size of the vulcanized sample, a' and b', were precisely measured in the same manner, and a ratio of a'/b' was determined. The obtained ratios, a/b and a'/b', were introduced into the following equation to obtain a shape-retention ratio.

Shape-retention ratio (%)=(a'/b')÷(a/b)×100

Example 1

A foamed article was prepared in the following manner, and the obtained article was subjected to the above-mentioned tests.

The composition set forth in Table 1 was kneaded in Banbury mixer (produced by Kobe Steel Co., Ltd.) of 4.3 l for 5 minutes.

TABLE 1

| (Composition) | |
|---|---|
| Component | Amount (part by weight) |
| Chlorinated ethylene/butene-1 copolymer (1) | 100.0 |
| Stearic acid | 3.0 |
| Magnesia (2) | 5.0 |
| Calcined clay (3) | 100.0 |
| Dioctyl terephthalate (4) | 50.0 |
| Titanium white | 5.0 |
| Processing aid (5) | 5.0 |
| Polyethylene glycol (6) | 1.0 |

(1) ethylene/butene-1 (molar ratio): 90/10
    chlorine content: 28% by weight
    Mooney viscosity [ML$_{1-4}$(121° C.)]: 90
(2) trade name: Kyowa Mag150, available from Kyowa Kagaku Kogyo Co., Ltd.
(3) trade name: Saranthone No. 1, available from Engelhard Mineral & Chem.
(4) available from Daihachi Kagaku Kogyosho Co., Ltd.
(5) trade name: Besta PP, available from Omi Kagaku Kogyo Co., Ltd.
(6) Mean molecular weight (Mw): 4,000, available from Wako Junyaku Kogyo Co., Ltd.

Subsequently, the kneadate having been dumped out was wound over a 14-inch open roll (produced by Nippon Roll Co., Ltd.), and to the kneadate was added the addities set forth in Table 2 on the open roll. At that time, the surface temperature of the front roll in the open roll was 60° C., and that of the back roll in the open roll was 70° C.,

TABLE 2

| Additive | Amount (part by weight) |
| --- | --- |
| 2-dibutylaminotriazine-4,6-dithiol (1) (vulcanizing agent) | 3.0 |
| Dicyclohexylamine benzoate (vulcanizing assistant) | 3.0 |
| Piperidine benzoate (vulcanizing assistant) | 2.0 |
| p,p'-oxybis(benzenesulfonylhydrazide) (2) (foaming agent) | 2.0 |

(1) trade name: ZISNET-DB, available from Sankyo Kasei Co., Ltd.
(2) trade name: Serogen OT, available from Uniroyal Co., Ltd.

The composition set forth in Table 1 and the additives set forth in Table 2 were together kneaded for 2 minutes as described above, and the obtained mixture was then cut into a composition rubber of ribbon form having a thickness of approx. 3 mm and a width of approx. 50 mm. Thereafter, the composition rubber of ribbon form was subjected to extrusion molding to form a tubular molded product using a 60 mm φ rubber extruder (produced by Nakada Zoki Co., Ltd., L/D=16, temperature: die/front cylinder/back cylinder=80° C./70° C./60° C.).

Subsequently, the tubular molded product was continuously dipped in a 10 wt. % isopropyl alcohol solution of Cotamin D86P (distearyldimethylammonium chloride, available from Kao Corporation), and the molded product was introduced into a hot air-vulcanizing bath to vulcanize and foam the molded product at 200° C. for 10 minutes. Thus, a tubular foamed article was obtained.

The values obtained on the physical properties of the foamed article are set forth in Table 8.

Comparative Example 1

The procedures of Example 1 were repeated except for omitting the dipping procedure to obtain a foamed article. The obtained foamed article was subjected to the aforementioned tests on physical properties.

The results are set forth in Table 8.

Example 2

The procedures of Example 1 were repeated except for not using the foaming agent, p,p'-oxybis(benzenesulfonylhydrazide), to obtain a non-foamed article. The obtained non-foamed article was subjected to the aforementioned tests on physical properties.

The results are set forth in Table 8.

Comparative Example 2

The procedures of Example 2 were repeated except for omitting the dipping procedure to obtain a non-foamed article. The obtained non-foamed article was subjected to the aforementioned tests on physical properties.

The results are set forth in Table 8.

Example 3

The procedures of Example 1 were repeated except for setting the concentration of the isopropyl alcohol solution of Cotamin D86P (distearyldimethylammonium chloride) to 1 wt. %, to obtain a foamed article. The obtained foamed article was subjected to the aforementioned tests on physical properties.

The results are set forth in Table 8.

Comparative Example 3

The procedures of Example 1 were repeated except for dipping the tubular molded product in isopropyl alcohol instead of dipping it in the isopropyl alcohol solution of Cotamin D86P, to obtain a foamed article. The obtained foamed article was subjected to the aforementioned tests on physical properties.

The results are set forth in Table 8.

Example 4

The procedures of Example 1 were repeated except for using the composition set forth in Table 3 instead of the composition of Example 1, to obtain a foamed article. The obtained foamed article was subjected to the aforementioned tests on physical properties.

The results are set forth in Table 8.

TABLE 3

| (Composition) | |
| --- | --- |
| Component | Amount (part by weight) |
| Chlorinated ethylene/propylene copolymer (1) | 100.0 |
| Stearic acid | 3.0 |
| Magnesia | 10.0 |
| Calcined clay | 80.0 |
| Dioctyl adipate (2) | 50.0 |
| Ethylene propylene rubber (3) | 20.0 |
| Nipsyl VN-3 (4) | 15.0 |
| Titanium white | 5.0 |
| Besta PP | 5.0 |
| Polyethylene glycol | 1.0 |

(1) ethylene/propylene (molar ratio): 80/20
 chlorine content: 25% by weight
 Mooney viscosity [ML$_{1-4}$(121° C.)]: 110
(2) available from Daihachi Kagaku Kogyosho Co., Ltd.
(3) available from Mitsui Petrochemical Industries, Ltd. Mooney viscosity [ML$_{1-4}$(121° C.)]: 63; Specific gravity: 0.87
(4) available from Nippon Silica Kogyo Co., Ltd.

Example 5 the procedures of Example 1 were repeated except for using the composition set forth in Table 4 instead of the composition set forth in Table 1 and using the additives set forth in Table 5 instead of the additives set forth in Table 2, to obtain a foamed article. The obtained foamed article was subjected to the aforementioned tests on physical properties.

TABLE 4

| (Composition | |
| --- | --- |
| Component | Amount (part by weight) |
| Chlorinated polyethylene (1) | 100.0 |
| Stearic acid | 3.0 |
| Magnesia | 5.0 |
| FEF carbon black | 50.0 |
| Dioctyl terephthalate | 50.0 |
| Besta PP | 5.0 |
| Polyethylene glycol | 1.0 |

(1) Kerlinal 3401, available from DSM Co., Ltd.
 chlorine content: 40% by weight
 Mooney viscosity [ML$_{1-4}$(121° C.)]: 88

TABLE 5

| Additive | Amount (part by weight) |
| --- | --- |
| 2-dibutylamiotriazine-4,6-dithiol (1) (vulcanizing agent) | 3.0 |

TABLE 5-continued

| Additive | Amount (part by weight) |
| --- | --- |
| Diethylene glycol/dicyclohexylamine (1/1) mixture (vulcanizing assistant) | 4.0 |
| p,p'-oxybis(benzenesulfonylhydrazide) (2) (foaming agent) | 2.0 |

(1) trade name: ZISNET-DB, available from Sankyo Kasei Co., Ltd.
(2) trade name: Serogen OT, available from Uniroyal Co., Ltd.
The results are set forth in Table 8.

Example 6

The procedures of Example 1 were repeated except for using the composition set forth in Table 6 instead of the composition set forth in Table 1 and using the additives set forth in Table 7 instead of the additives set forth in Table 2, to obtain a non-foamed article. The obtained non-foamed article was subjected to the aforementioned tests on physical properties.

TABLE 6

(Composition)

| Component | Amount (part by weight) |
| --- | --- |
| Chlorosulfonated polyethylene (1) | 100.0 |
| Stearic acid | 3.0 |
| Magnesia | 10.0 |
| FEF carbon black | 50.0 |
| Dioctyl terephthalate | 20.0 |
| Besta PP | 10.0 |
| Polyethylene glycol | 1.0 |

(1) Hyparon 40, Showa Denko Dupont Co., Ltd.
chlorine content: 35% by weight
Mooney viscosity [ML$_{1-4}$(121° C.)]: 38

TABLE 7

| Additive | Amount (part by weight) |
| --- | --- |
| Triazine-2,4,6-trithiol (1) (vulcanizing agent) | 1.5 |
| Benzoic acid/piperidine (1/1) salt (vulcanizing assistant) | 3.5 |

The results are set forth in Table 8.

TABLE 8

| | Ex. 1 | Comp. Ex. 1 | Ex. 2 | Comp. Ex. 2 | Ex. 3 | Comp. Ex. 3 | Ex. 4 | Ex. 5 | Ex. 6 |
| --- | --- | --- | --- | --- | --- | --- | --- | --- | --- |
| Embodiment of Article | Foamed | Foamed | Nonfoamed | Nonfoamed | Foamed | Foamed | Foamed | Foamed | Nonfoamed |
| Apparent specific gravity | 0.45 | 0.48 | — | — | 0.47 | 0.47 | 0.48 | 0.55 | — |
| Tensile strength (kg/cm$^2$) | 25 | 21 | 87 | 83 | 22 | 20 | 23 | 30 | 172 |
| Surface roughness (μm) | 4 | 30 | 3 | 4 | 4 | 33 | 5 | 6 | 5 |
| Shape-retentin ratio (%) | 85 | 40 | 91 | 50 | 83 | 35 | 95 | 80 | 86 |

What is claimed is:

1. A vulcanized rubber article which is prepared by vulcanizing a vulcanizable molded product made of a chlorinated ethylene/α-olefin copolymer rubber, said vulcanizable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

2. A process for the preparation of a vulcanized rubber article comprising the steps of coating a surface of a vulcanizable molded product made of a chlorinated ethylene/α-olefin copolymer rubber with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing the vulcanizable molded product.

3. A vulcanized rubber article which has a surface roughness of less than 10 μm and is prepared by vulcanizing and foaming a vulcanizable and formable molded product made of a chlorinated ethylene/α-olefin copolymer rubber, said vulcanizable and foamable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

4. A process for the preparation of a vulcanized rubber article comprising the steps of coating a surface of a vulcanizable and foamable molded product made of a chlorinated ethylene/αolefin copolymer rubber with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing and foaming the vulcanizable and foamable molded product.

5. A vulcanized rubber article which is prepared by vulcanizing a vulcanizable molded product made of chlorinated polyethylene, said vulcanizable molded product having been surface-treated with a coating solution containing at least one compound selected from alkylammonium halide, alkylphosphonum halide, amine having an acid dissociation constant (pka) of not less than 10 and amine salt having an acid dissociation constant (pKa) of not less than 10.

6. A process for the preparation of a vulcanized rubber article comprising the steps of coating a surface of a vulcanizable molded product made of chlorinated polyethylene with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing the vulcanizable product.

7. A vulcanized rubber article which has a surface roughness of less than 10 μm and is prepared by vulcanizing and foaming a vulcanizable and formable molded product made of chlorinated polyethylene, said vulcanizable and foamable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

8. A process for the preparation of a vulcanized rubber article comprising the steps of coating a surface of a vulcanizable and foamable molded product made of chlorinated polyethylene with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing and foaming the vulcanizable and foamable product.

9. A vulcanized rubber article which is prepared by vulcanizing a vulcanizable molded product made of chlorosulfonated polyethylene, said vulcanizable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

10. A process for the preparation of a vulcanized rubber article comprising the steps of coating a surface of a vulcanizable molded product made of chlorosulfonated polyethylene with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing the vulcanizable product.

11. A vulcanized rubber article which has a surface roughness of less than 10 μm and is prepared by vulcanizing and foaming a vulcanizable and formable molded product made of chlorosulfonated oplyethylene, said vulcanizable and foamable molded product having been surface-treated with a coating solution containing at least one compound selected from alkylammonium halide, alkylphosphonium halide, amine having an acid dissociation constant (pKa) of not less than 10 and amine salt having an acid dissociation constant (pKa) of not less than 10.

12. A process for the preparation of a vulcanized rubber article comprising the steps of coating a surface of a vulcanizable and foamable molded product made of chlorosulfonated polyethylene with a coating solution containing at least one compound selected from alkylammonium halide, alkylphosphonium halide, amine having an acid dissociation constant (pKa) of not less than 10 and amine salt having an acid dissociation constant (pKa) of not less than 10, and vulcanizing and foaming the vulcanizable and foamable product.

* * * * *